P. L. DILLS.
DOUGH MIXING TRAY AND BOARD.
APPLICATION FILED APR. 14, 1920.

1,414,074.

Patented Apr. 25, 1922.
2 SHEETS—SHEET 1.

Inventor
Philip L. Dills

By D. Swift

Attorney

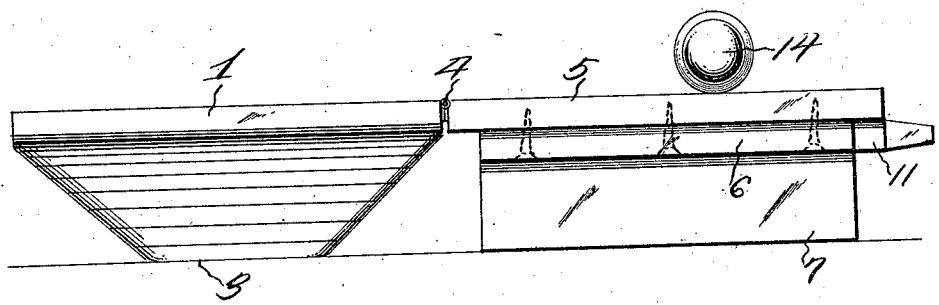
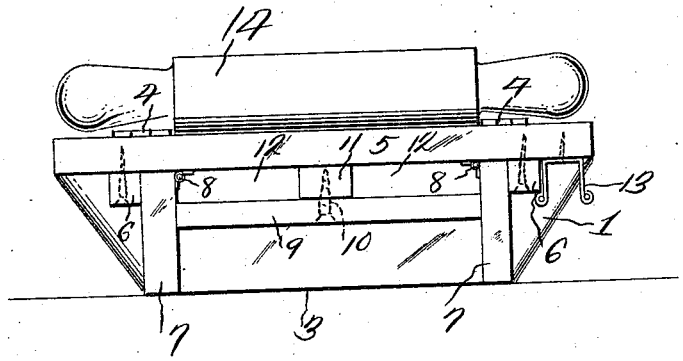

UNITED STATES PATENT OFFICE.

PHILIP L. DILLS, OF BLAIRSVILLE, GEORGIA, ASSIGNOR OF ONE-THIRD TO C. L. SHOPE, OF BLAIRSVILLE, GEORGIA, AND TWO-THIRDS TO W. N. CLEMENT, OF YOUNG CANE, GEORGIA.

DOUGH-MIXING TRAY AND BOARD.

1,414,074.  Specification of Letters Patent.  Patented Apr. 25, 1922.

Application filed April 14, 1920. Serial No. 373,804.

*To all whom it may concern:*

Be it known that I, PHILIP L. DILLS, a citizen of the United States, residing at Blairsville, in the county of Union, State of Georgia, have invented a new and useful Dough-Mixing Tray and Board; and I do hereby declare the following to be a full, clear, and exact description of the invention, such as will enable others skilled in the art to which it appertains to make and use the same.

The invention relates to dough mixing trays and boards and has for its object to provide a device of this character comprising a dough mixing tray in which the dough is mixed and worked and to provide in connection therewith a dough board on which the dough may be rolled and formed as desired. Also to provide collapsible legs carried by the under face of the board so that said board may have its upper face supported in the same horizontal plane as the upper face of the tray, said collapsible legs being adapted to be folded against one side of the board and the board as a whole folded onto the top of the tray, thereby collapsing the same into compact form for storage and other purposes.

A further object is to provide the board with brackets for holding a conventional form of rolling pin so that said rolling pin may at all times when not in use be stored with the device.

With the above and other objects in view the invention resides in the combination and arrangement of parts as hereinafter set forth, shown in the drawings, described and claimed, it being understood that changes in precise embodiment of the invention may be made within the scope of what is claimed without departing from the spirit of the invention.

In the drawings:—

Figure 3 is a side elevation of the combined dough tray and board showing the same in open position.

Figure 4 is a front elevation of the device showing the same in open position.

Figure 1:
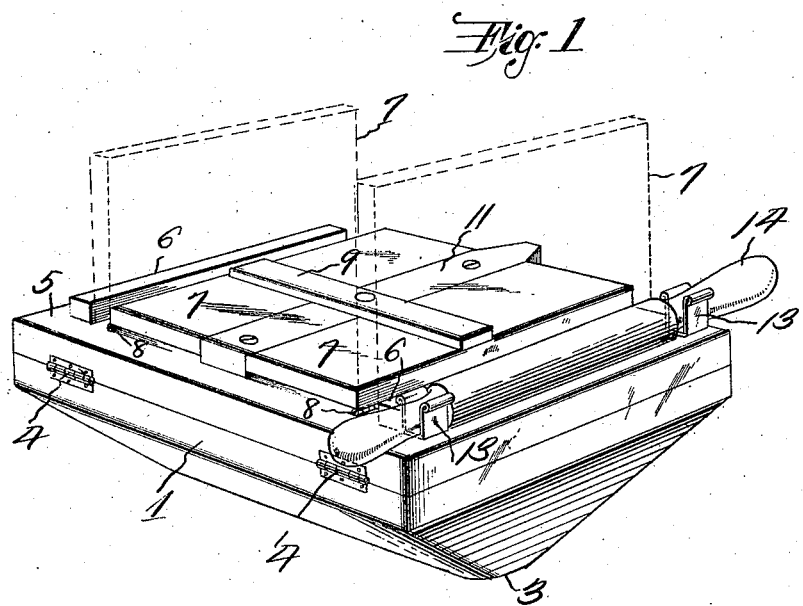
Figure 1 is a perspective view of the device showing the same in collapsed position.
Figure 2:
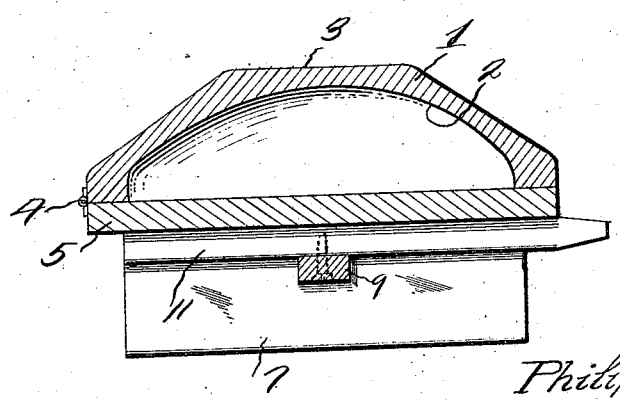
Figure 2 is a sectional view through the dough tray and board showing the board supported so that the dough tray can be folded outwardly on its hinging point so that it will rest on the support on which the legs rest.

Referring to the drawings the numeral 1 designates the dough tray, which tray is provided with a depression 2 in which dough is worked and kneading as desired. The dough tray is provided with a flattened surface 3, which surface rests upon a table or other support when the device is in open position as shown in Figure 3. The dough tray 1 is hingedly connected as at 4 to a board 5, on which the dough after it has been worked may be rolled into desired shapes and forms.

Secured to the under face of the board 5 are battens 6 which battens form means whereby the board is kept from warping and at the same time form limiting stops and braces for the foldable legs 7 which legs are hingedly connected as at 8 to the under face of the board 5. The legs 7 are adapted to rest upon a supporting table or other surface as shown in Figures 3 and 4 and are held in their extended positions by means of a pivoted bar 9, which bar is pivoted as at 10 to a batten 11 which is secured to the under face of the board 4. The batten 11 is sufficiently thick so that when the legs 7 are folded into the spaces between the battens 6 and 11, the bar 9 may be again extended to the position as shown in Figure 4 for holding the legs 7 against the under face of the board 5 after which the board 5 may be folded onto the top of the dough tray 1 as shown in Figure 1 thereby collapsing the same to reduce its bulk for storage purposes. Secured to the under face of the board 5, at one edge thereof are U-shaped members 13, the arms of which have sufficient spring so that it will hold a conventional form of rolling pin 14, the object being to provide means whereby the rolling pin may be held and supported on the combined dough tray and board when the same is not in use thereby obviating the possibility of loss or misplacement of the same.

From the above it will be seen that a combined dough tray and board is provided which is simple in construction, compact in form and one wherein all of the usual devices used in working dough in a kitchen are combined together so that they will be always ready for use.

The invention having been set forth what is claimed as new and useful is:—

1. The combination with a dough mixing tray, of a board hingedly connected to one edge thereof and adapted to be supported in substantially the same horizontal plane as the upper side of the tray, supporting legs for supporting the board, said legs being hingedly connected to the bottom face of the board, a centrally pivoted bar pivoted centrally between the legs and to the board, said bar being so positioned in relation to the bottom of the board that it will hold the legs extended or collapsed against the bottom of the board as desired and members engaging the outer faces of the legs for limiting and bracing the legs in their outward movement against the jamming action of the centrally pivoted bar.

2. The combination with a dough mixing tray, of a cover hingedly connected to one side thereof and adapted to be supported in the same horizontal plane as the upper side of the tray, supporting legs for supporting said board, said legs being hingedly connected to the bottom face of the board at points spaced from its sides and at right angles from the hinged side of the board, said supporting legs comprising elongated members, stops for limiting the outward movement of the legs when positioned vertically in relation to the bottom face of the board, a centrally pivoted bar, said bar being pivoted on a raised portion carried by the board and disposed between the free ends of the legs, said bar being so positioned that when longitudinally disposed its ends will engage the inner sides of the hinged legs and hold them rigidly against their stops and so positioned that when the legs are folded onto the bottom of the board said bar will engage over said legs and hold them in collapsed position.

In testimony whereof I have signed my name to this specification in the presence of two subscribing witnesses.

PHILIP L. DILLS.

Witnesses:
 PAT HARALSON,
 C. L. L. SHOPE.